(12) United States Patent
Williams et al.

(10) Patent No.: US 6,700,528 B2
(45) Date of Patent: Mar. 2, 2004

(54) MOTION DETECTION AND ALERTING SYSTEM

(75) Inventors: Christopher R. Williams, Grafton, NH (US); Norbert E. Yankielun, Lebanon, NH (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/255,763

(22) Filed: Sep. 27, 2002

(65) Prior Publication Data

US 2003/0034912 A1 Feb. 20, 2003

(51) Int. Cl.$^7$ .............................. G01S 7/40; G01S 13/58
(52) U.S. Cl. ..................... 342/28; 342/104; 342/114; 342/115
(58) Field of Search ..................... 342/26, 28, 99, 342/104, 114, 115; 340/962, 539.36, 601

(56) References Cited

U.S. PATENT DOCUMENTS

| | | | |
|---|---|---|---|
| 5,262,783 A | 11/1993 | Philpott et al. ............ 342/28 |
| 5,497,163 A | 3/1996 | Lohninger et al. ......... 342/175 |
| 5,585,799 A | 12/1996 | Yankielun et al. .......... 342/15 |
| 5,587,713 A | 12/1996 | Pfizenmaier ................ 342/70 |
| 5,684,458 A | 11/1997 | Calvarese ................. 340/554 |
| 5,966,090 A | 10/1999 | McEwan .................... 342/27 |
| 5,977,874 A | 11/1999 | Kostandelos .............. 340/554 |
| 6,324,912 B1 | 12/2001 | Wooh ....................... 73/629 |
| 6,333,691 B1 | 12/2001 | Janus ....................... 73/629 |
| 6,380,882 B1 | 4/2002 | Hegnauer .................. 342/28 |
| 6,535,141 B1 * | 3/2003 | Doherty .................... 340/905 |
| 6,538,578 B1 * | 3/2003 | Doherty .................... 340/905 |
| 2002/0121132 A1 * | 9/2002 | Breed et al. ................. 73/146 |
| 2003/0034912 A1 * | 2/2003 | Williams et al. ............ 342/28 |

OTHER PUBLICATIONS

"New microwave sensors for intrusion detection systems", Martinez, F.P.; Galeano, F.C.; Security Technology, 1999. Proceedings. IEEE 33rd Annual International CarnahanConference on , Oct. 5–7, 1999 P(s): 49–53.*
"Ocean Wave Detection and Direction Measurements with Microwave Radars", Teleki, P.; Shuchman, R.; Brown, W.; McLeish, W.; Ross, D.; Mattie, M.; Oceans, vol.: 10 , Sep 1978 pp.: 639–648.*
"A compact low–cost add–on module for Doppler radar sensing of vital signs using a wireless communications terminal", Lubecke, V.; Boric–Lubecke, O.; Beck, E.; Microwave Symposium Digest, 2002 IEEE MTT–S Intern'l, vol.: 3 , Jun. 2–7, 2002 P(s): 1767–1770.*

\* cited by examiner

*Primary Examiner*—John B. Sotomayor
(74) *Attorney, Agent, or Firm*—Earl H. Baugher, Jr.

(57) ABSTRACT

A compact, autonomous motion detecting and alerting system alerts to the movement of objects of interest. Mounted on an environmentally sealed PC board are a transceiver such as a CW radar front-end, connectors, signal processors and a communications device. The system provides early warning of movement of an ice sheet or rubble field via the communication device that may be a cellular telephone. This system is mounted proximate the target surface under observation, oriented at pre-specified offset angles both laterally and in elevation. The target is illuminated and energy reflected therefrom is mixed with a portion of the transmitted signal to produce a difference frequency signal that is processed to establish existence of motion within a pre-specified velocity range. Upon verification of motion, notification is sent to a responsible authority. An autonomous or semi-autonomous power source and integral power management function may be incorporated on the same PC board.

20 Claims, 6 Drawing Sheets

MOTION DETECTION AND ALERTING SYSTEM

STATEMENT OF GOVERNMENT INTEREST

The invention described herein may be manufactured and used by or for the United States Government for governmental purposes without the payment of any royalties thereon.

FIELD OF THE INVENTION

The present invention relates generally to autonomous detection and alerting to motion, such as ice flow in a river. More particularly, it provides a sealed, inexpensive, fully integrated, remote, early-warning system for continuous detection and early warning of river ice flow hazards. It may be solar powered with battery backup, with an option for at least one battery to be solar rechargeable.

BACKGROUND

Alerting to a waterway's ice motion during winter frazil ice flow and spring ice breakup is important. The ability to detect river ice sheet and rubble motion can provide early warning to communities and facilities down-river, helping prevent the loss of life, flooding, and infrastructure damage often associated with massive ice rubble flows. Unfortunately, this information is often not available at all, and, when available, it may be hazardous, difficult, time consuming, and expensive to obtain.

Currently, there are three methods employed to detect movement of an ice sheet. The first, visual observation, requires the constant attention of a human observer. This method is particularly inefficient, as it can be hindered by darkness or by low-visibility weather conditions.

Video monitoring of the ice sheet is similarly limited by the short periods of daylight in northern latitudes in the winter, weather conditions and the need for the presence of both equipment and operator at the time the ice sheet moves. Video monitoring has the further disadvantage of requiring tedious, frame-by-frame motion analysis and the inclusion of known benchmarks in the video frame from which to measure or detect motion.

A third method uses a frangible wire embedded in the river ice to detect movement. When the ice moves, the wire breaks, opening a circuit and triggering an alarm. However, deploying the wire across the ice sheet or rubble field may be extremely hazardous. Furthermore, this primitive method provides only a one-time indication of movement, thereby necessitating repeated hazardous deployments in order to reset the alarm.

A number of patents utilizing the Doppler effect at various frequencies for motion detection and other applications have been issued. Each is distinguishable from the instant invention.

U.S. Pat. No. 5,585,799, Microwave Doppler Radar System for Detection and Kinematic Measurements of River Ice, to Yankielun and Ferrick, Dec. 17, 1996, incorporated herein by reference, teaches a Doppler ice motion detection system for measuring the velocity of an ice sheet. However, the device disclosed in the '799 patent is not capable of autonomous operation, and is thus not well suited to long-term monitoring of an ice sheet. Further, it employs expensive components, making it relatively less suitable for widespread use in simple detection of the dynamics of ice sheet motion. Rather, it is best used when seeking highly accurate scientific data during a relatively short-term movement of an ice sheet.

U.S. Pat. No. 6,333,691 B1, Motion Detector, to Janus, Dec. 25, 2001, employs the Doppler phenomena to detect motion by comparing phase or amplitude changes as determined from separate transmit and receive antennas. It also permits operation of the system through otherwise interfering materials via judicious selection of the frequency of operation.

U.S. Pat. No. 6,324,912 B1, Flaw Detection System Using Acoustic Doppler Effect, to Wooh, Dec. 4, 2001, employs an acoustic transducer and makes use of the Doppler effect at acoustic frequencies to detect flaws in material under inspection. A particular application is detecting flaws in railroad tracks in real time during operation of a rail riding vehicle.

U.S. Pat. No. 5,587,713, Radar Transmitter/Receivers, to Pfizenmaier, et al., Dec. 24, 1996, provides an RF transmit-receive capacity on a single PC board using a ratrace device for inputting RF energy to a mixer from the transmitter and the transmit-receive antenna.

U.S. Pat. No. 5,966,090, Differential Pulse Radar Motion Sensor, to McEwan, Oct. 12, 1999, details a pulsed Doppler system for overcoming inherent disadvantages of CW Doppler systems. It yields a constant response versus distance to motion within at least one gated range. It may also provide target direction using a quadrature receive channel.

U.S. Pat. No. 6,380,882 B1, Motion Detector Based on the Doppler Principle, to Hegnauer, Apr. 30, 2002, uses two separate RF frequencies to detect motion within a room, comparing the phase difference between these two to detect motion. The design also incorporates suppression circuitry to deal with multi-path interference.

U.S. Pat. No. 5,977,874, Relating to Motion Detection Units, to Konstandelos, Nov. 2, 1999, provides an RF transceiver on 2 separate PC boards, one for the electronics and the other for the transmit-receive antenna. The two boards are separated by a common ground plane in a preferred embodiment. The system employs the Doppler phenomenon to detect motion and is of a smaller size than previous designs.

U.S. Pat. No. 5,262,783, Motion Detector Unit, to Philpott et al., Nov. 16, 1993, is similar to the '874 patent in that it consists of two PC boards, an antenna board and the electronics board. However, the boards have no electrical connection therebetween, relying on two slots resonant at the oscillator's fundamental frequency to couple the antenna to the transceiver. Feed striplines on the boards lie orthogonal to the slots, suppressing the oscillator's $2^{nd}$ harmonic frequency.

U.S. Pat. No. 5,497,163, Doppler Radar Module Using Micro-Stripline Technology, to Lohninger et al., Mar. 5, 1996, provides a transceiver and mixer-antenna configuration for utilizing the Doppler effect. It is mounted on a compact multi-layer motherboard, enclosed in a housing of electrically conductive material.

U.S. Pat. No. 5,684,458, Microwave Sensor with Adjustable Sampling Frequency Based on Environmental Conditions, to Calvarese, Nov. 4, 1997, provides an adjustable motion detector using the Doppler effect. For adverse environmental conditions, such as thermal noise, that exceed a pre-specified threshold, a processor incorporated in the system changes the sampling frequency.

Thus, needed is an autonomous, reliable and inexpensive detection and warning device that also eliminates exposure of personnel to environmental hazards when installing or maintaining it. Applications in nature include warning of flash floods, mudslides, tidal waves, tsunamis, land slides (falling rocks), and snow avalanches. In industry, applications include landslides in open-pit mining operations, instabilities in below ground mines, and security operations including perimeter or border monitoring and intrusion sensing.

SUMMARY

A preferred embodiment of the present invention is a compact and relatively inexpensive motion detection and alerting system implemented in a single, environmentally secure and benign package. Further it is capable of autonomous continuous operation, if necessary. It operates autonomously detecting motion within a pre-specified velocity range. In general its components include a transceiver sub-assembly and a signal processing sub-assembly.

The transceiver sub-assembly propagates electromagnetic energy as a transmitted signal in a pre-specified pattern and direction to illuminate a non-smooth surface. It receives at least some energy reflected therefrom as a reflected signal and provides a reference signal.

The signal processing sub-assembly communicates with the transceiver sub-assembly, determining the difference in frequency between a reference sample of the transmitted signal and the reflected signal. Further processing establishes the existence of a pre-specified range of Doppler frequencies that may be correlated to motion of the non-smooth surface, e.g., an ice sheet. Using a decision algorithm to identify non-transient velocities within a pre-specified velocity range enables alerting via a cellular telephone.

Components of the transceiver sub-assembly include a transceiver, a T-connector between the transceiver and an antenna, an impedance matching device between the T-connector and the antenna, and a signal mixer connected to the "base" of the T-connector. The signal mixer receives signal inputs from the transceiver and the antenna via the T-connector and outputs signal products, to include a signal at a Doppler frequency as appropriate.

In a preferred embodiment, the system is mounted on a single printed circuit (PC) board. The PC board includes a CW microwave source having an average output power between 10 and 20 dBm, the T-connector, an impedance matching transformer, a strip line beam antenna and a single-end signal mixer.

The antenna may be any of: a stripline antenna, a stripline beam antenna, a Yagi stripline beam antenna, a log periodic array (LPA) stripline beam antenna, a wire element beam antenna, a tubular element beam antenna, a microwave horn antenna, a microwave dish antenna, and any combination thereof. However, for the system to be fitted to a preferred embodiment, i.e., a single PC board, only the stripline antennas may be used. Preferably, the antenna offers forward gain of approximately at least 10 dB and antenna main lobe dimensions of approximately 60° or less.

Preferably, the processing sub-assembly includes analog circuitry connected to the transceiver sub-assembly through a mixer. This analog circuitry conditions output signals from the mixer for digital processing. Digital circuitry receives conditioned output signals from the analog circuitry, converts it to digital format, and employs a decision algorithm for determining movement of the non-smooth surface. A communications device receives output from the digital circuitry that indicates target movement and provides the necessary alert.

In a preferred embodiment, the analog circuitry includes a first amplifier for amplifying the signal products from the mixer, a bandpass filter that passes only those Doppler frequencies that correlate to the pre-specified velocity range, a second amplifier for amplifying the output of the bandpass filter, and a Schmitt trigger for final conditioning of the output from the second amplifier.

The digital circuitry includes an analog-to-digital (A/D) converter for converting the output of the Schmitt trigger, a digital signal processor (DSP), and a communications device including an autodialer, a cellular phone and a cellular phone antenna. The DSP implements a decision algorithm and an optional power management function. Preferably, all system components noted above are enclosed within a weatherproof enclosure.

Preferably, the system includes it own power source installed on the single PC board. The power source may include a solar panel augmenting a rechargeable battery. Further, a preferred embodiment may include its own mounting bracket. In addition to the system itself, a unique method of implementing a motion detection capability is provided.

Provided is a method for detecting and alerting to the movement of an irregular or non-smooth target surface. It comprises mounting a motion detection and alerting system of the present invention at a pre-selected look angle in azimuth and elevation; providing power to the system; illuminating at least part of a target surface with a signal containing electromagnetic energy; receiving energy reflected from the target surface as a result; processing the reflected energy together with a reference signal provided from the transceiver to produce a difference frequency signal representing the difference in frequency between the reference signal and the reflected energy; establishing a value of the difference frequency signal, such that a non-zero value indicates motion that may be of a pre-specified type; processing any non-zero value difference signals by implementing a decision algorithm to minimize false alarms; and using the output of the decision algorithm, providing notification of any occurrence of the pre-specified type of motion. The notification, at least in part, may comprise placing a telephone call automatically. Establishing the value of the difference frequency signal may further comprise introducing a pre-specified delay period prior to sending the notification.

Further, the method may include selectively powering the components based on system demand, i.e., power management. It may also include mounting the system such that the antenna is oriented in respect to the target surface at an offset angle less than approximately 60° both laterally and in elevation and more preferably at an offset angle between approximately 0° and 30° both laterally and in elevation. Should one desire to use the system for capturing precise measures of movement velocity, one may employ an inclinometer to achieve an accuracy of at least ±1.0° in orienting said system.

In a preferred embodiment, an autonomous ice sheet and rubble motion detecting and alerting system is provided in which components of the system as described above are mounted on a single printed circuit (PC) board. The existence of a pre-specified range of Doppler frequencies is correlated to an expected velocity of motion representative of the ice sheet and rubble.

Any embodiment of the system may be powered by any of a number of sources including a source remote from its location and a backup source.

In one application, a preferred embodiment of the present invention is mounted at a location proximate a target surface to be observed such as an ice sheet or rubble (debris) field. The target may be remote from the responsible authority who may be mobile, thus a wireless communications device is provided in a preferred embodiment. A reference signal, $f_{source}$, is transmitted from the antenna towards the target surface. Resultant reflected radiation, i.e., the "backscattered" portion, is mixed with a portion of the transmitted signal sampled for that purpose. This mixing produces a difference, or Doppler, frequency $f_{DOP}$, which is then processed to establish movement of the target surface.

Digital circuitry implementing a decision algorithm establishes movement of the target surface, including movement on the target surface. Using the decision algorithm, the difference frequency is established to be non-zero for a sufficient amount of time to rule out transient motion, e.g., a hiker crossing the transceiver's field of vision. Upon such determination, the system sends a notification, preferably over a wireless communications device, to a responsible authority at a remote location.

Further advantages of the present invention will be apparent from the description below with reference to the accompanying drawings, in which like numbers indicate like elements.

DETAILED DESCRIPTION

Figure 1:
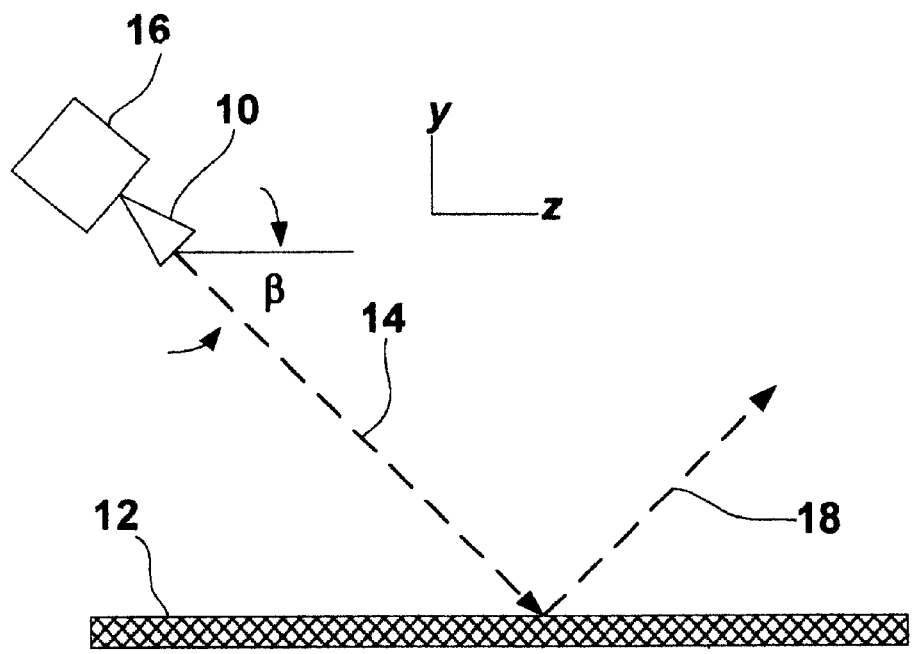
FIG. 1 depicts signal scatter in two dimensions from a smooth surface, the signal being oriented from the vertical at an angle, β.

Refer to FIG. 1. A signal 14 is transmitted towards a smooth surface 12. For example, in one application a continuous wave (CW) radar front-end (transceiver) 16 employing a signal 14 having a single frequency radio frequency (RF) carrier is transmitted from an antenna 10 at an oblique depression angle, β. If the radar-illuminated area (target surface) were perfectly smooth, as shown in FIG. 1, energy in the transmitted signal 14 incident to the smooth surface 12 results in reflections 18 away from the radar's transmit/receive antenna 10.

Figure 2:
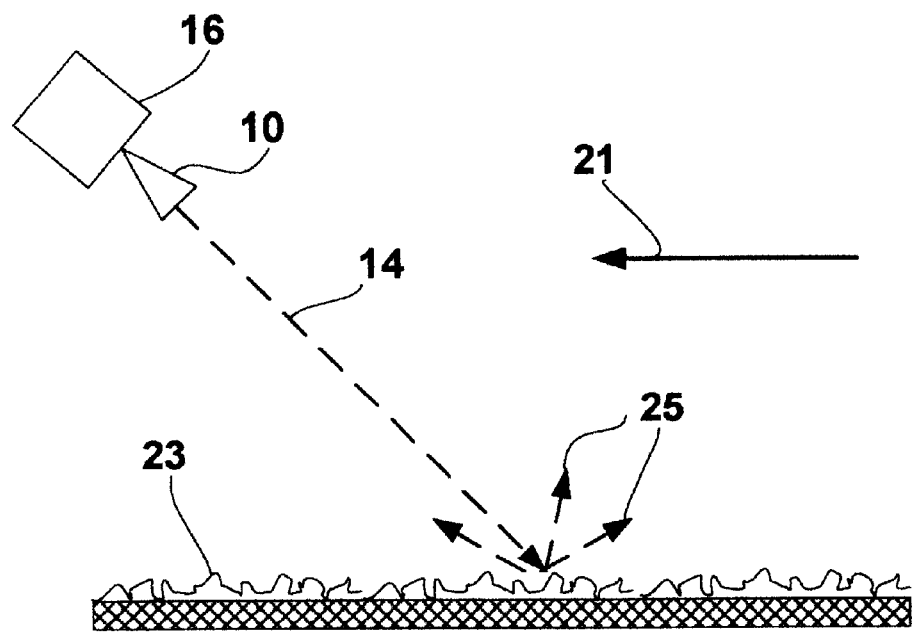
FIG. 2 depicts signal scatter in two dimensions from a rough surface with the expected direction of target surface movement indicated by an arrow.

Refer to FIG. 2. Due to the inherent roughness of many surfaces such as sheet ice and rubble fields as depicted at the surface 23, there is sufficient reflection (backscatter) 25 towards the radar antenna 10 to facilitate Doppler velocity measurements. If this target surface 23 is moving, the reflected radar signal 25 exhibits an apparent shift from the carrier frequency of the transmitted signal 14. The backscattered radar signal 25 has a higher frequency than that of the transmitted signal 14 if the target surface 23 is moving towards the radar antenna 10, and a lower frequency than that of the transmitted signal 14 if the target surface 23 is moving away from the radar antenna 10. The difference between the frequency of the transmitted signal 14 and the apparent frequency of the backscattered signal 25 is the Doppler, or difference, frequency, $f_{DOP}$, and is proportional to the velocity, v, of the target surface 23.

Figure 3:
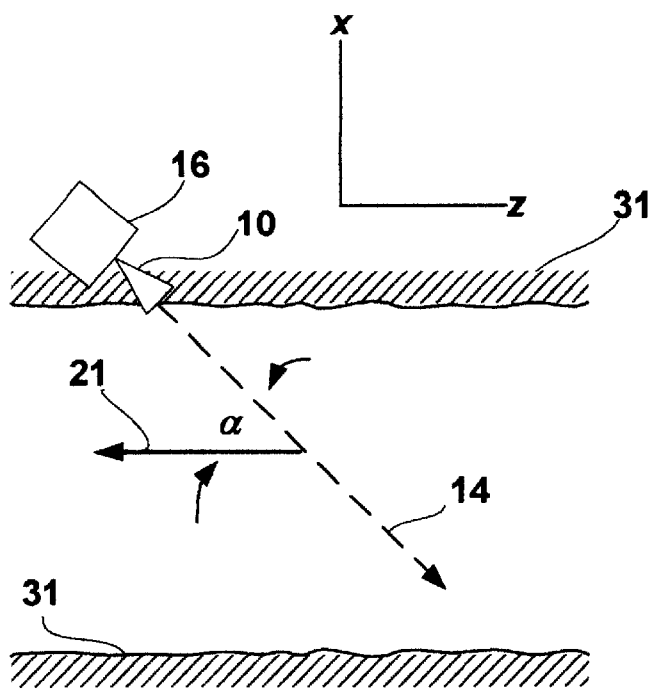
FIG. 3 depicts the relative lateral positioning of a preferred embodiment of the present invention with respect to a target surface under observation, such as a waterway.

Refer to FIG. 3. Shown is a top view of a waterway with sides 31. The transceiver 16 and antenna 10 are oriented with respect to the direction of flow (along the z-axis) 21 in the waterway such that the transmitted signal 14 is at an angle, α, with respect to the direction of flow (z-axis) 21 and the x-axis at that point in the waterway.

The magnitude of the Doppler frequency shift, $f_{DOP}$, for a target surface 23 moving at a given velocity, v ( m/s), is $$f_{DOP} = \frac{2v\cos(\beta)\cos(\alpha)}{\lambda} \qquad (1)$$

where β represents the vertical depression look-angle, α is the horizontal ("off-stream") look angle, and λ is the wavelength (m) of the transmitted signal 14. λ is given by the equation $\lambda = c/f_{source}$, where c is the velocity of light in a vacuum ($3 \times 10^8$ m/s) and $f_{source}$ is the carrier frequency (Hz) of the transmitted signal 14. The geometry relevant to the above calculations is illustrated in FIGS. 1 (y-z plane), and 2 (x-z plane), where the arrow 21 represents the direction of flow in a waterway, i.e., along the z-axis.

Figure 4:
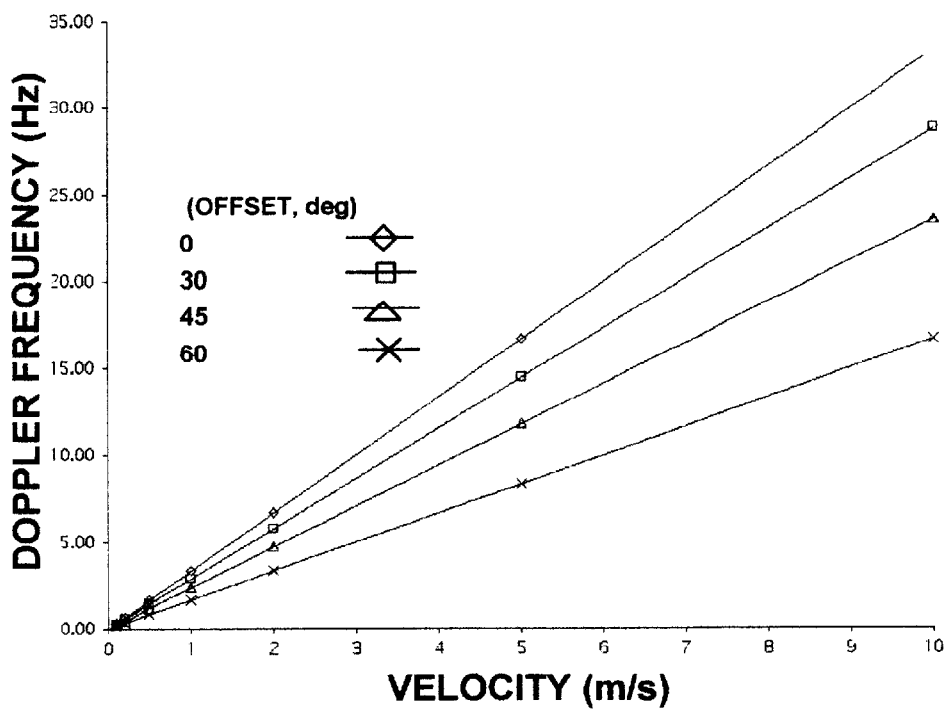
FIG. 4 is a graph of target velocity versus Doppler frequency for various angles of a transceiver's offset in elevation from the target surface.

Refer to FIG. 4. The velocity, v, of the target surface 23 is plotted versus the vertical depression (offset) angle, β, for the offset angles of 0°, 30°, 45°, and 60°. As can be seen, the greater the offset angle, β, the more sensitive the system is to small changes in Doppler frequency, $f_{DOP}$. Thus if one were interested in not only the velocity but a rate of instantaneous change, i.e., acceleration, then a large offset angle may be used, but otherwise a small offset angle (in both lateral (α) and vertical (β) directions), yields the greatest discrimination and is used in a preferred embodiment of the present invention.

In an application using a CW radar front-end as the transceiver 16, a sample of the transmitted signal 14 at its carrier frequency, $f_{source}$, "sampled" or "bled off" at a level sufficient to assure its accuracy as a current (real time) reference, is used as the reference signal. It is mixed with the received backscatter signal 25. The mixing process results in four frequency products: that of the reference signal, that of the backscattered signal 25, and a sum and a difference, respectively, of the reference and backscattered frequencies. The difference frequency resulting from the mixing process is the Doppler frequency, $f_{DOP}$. If the target surface 23 were stationary, then $f_{DOP}=0$. Thus, the presence of a non-zero Doppler frequency signal indicates possible movement of the target surface 23, thereby providing a means for motion detection and alerting. Of course, movement of objects on the target surface 23 would also be indicated. As discussed below, a means for distinguishing movement of the target surface 23 from movement on the target surface 23 is provided for a preferred embodiment of the present invention.

Figure 5:
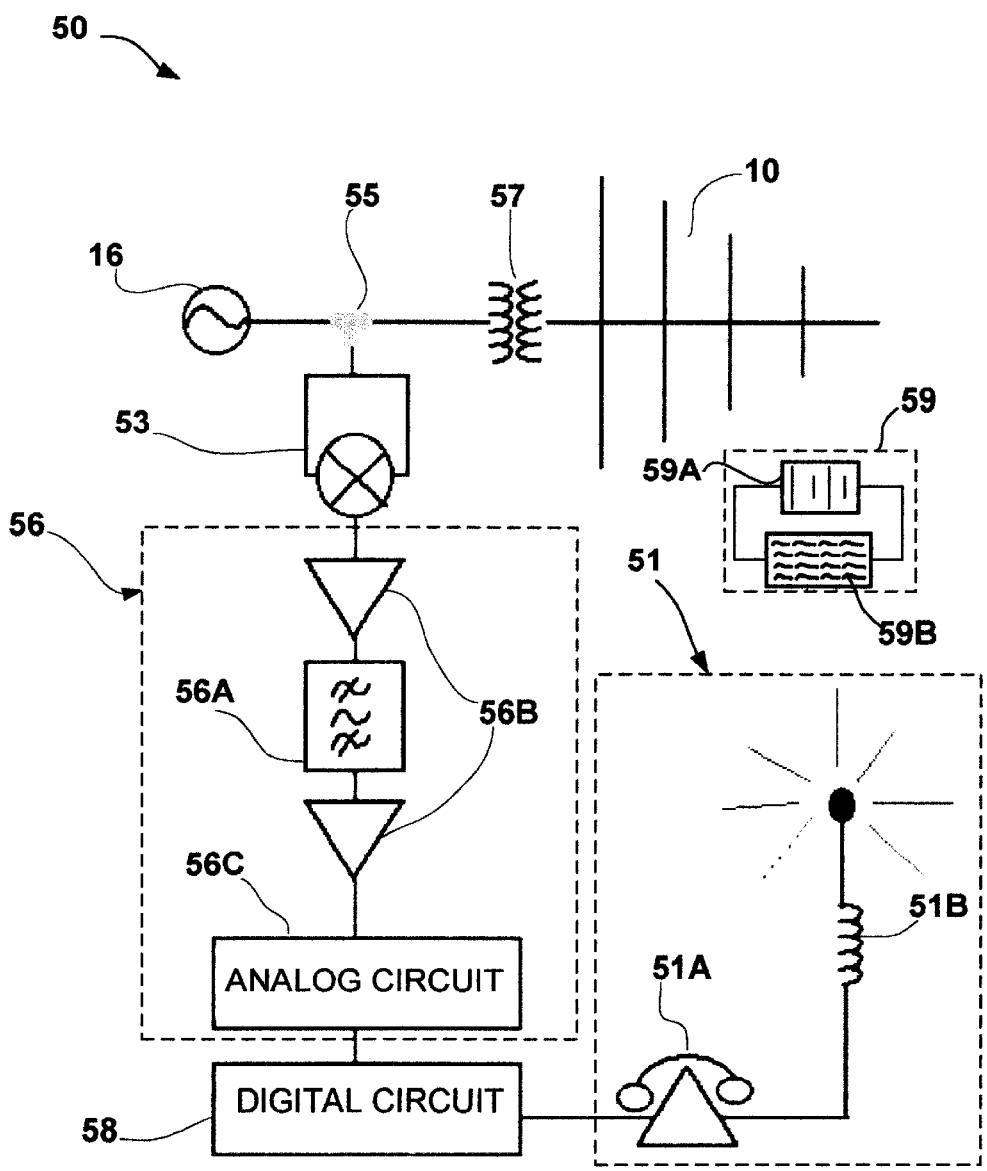
FIG. 5 is a schematic diagram of a preferred embodiment of the present invention.

Referring now to FIG. 5, there is shown a schematic diagram of a preferred embodiment 50 of the present invention, such as may be used as an ice motion detection and alerting system. The motion detection and alerting system 50 includes an antenna 10, a T-connector 55, an impedance matching transformer 57, a radar front-end 16, preferably a low-power CW microwave source having an average output of 10–20 dBm, analog circuitry 56, a digital circuit 58, a wireless communications device 51, and a mixer 53. A power source (not separately shown) may also be provided. Optionally, for those remotely located systems, an integrated power source 59 shown in FIG. 5 as a battery 59A supplemented via a solar panel 59B, may be used. The antenna 10, CW radar front-end 16, and mixer 53 are interconnected, for example, by a T-junction 55, or a microwave circulator (not separately shown), with the antenna 10 being connected through the impedance matching transformer 57. Though less efficient, a T-junction 55 is preferred over a microwave circulator because of its lower cost.

The antenna 10 is preferably a stripline beam antenna, such as a Yagi or log periodic array (LPA). A stripline antenna (that is, an antenna etched directly into a printed circuit board) is economical and directly interfaces with system electronics mounted on the same circuit board 64. A Yagi or LPA antenna offers both forward gain of at least 10 dB and antenna main lobe dimensions of 60° or less. In alternative embodiments, wire element beam, tubular element beam, microwave horn, and microwave dish antennas (all not separately shown) may be used. The mixer 53 may be a single-end mixer or a detector diode (not separately shown) operating as a mixer. It outputs the signal products described above, i.e., a reference signal, a backscattered signal 25, a difference frequency signal at $f_{DOP}$, and a summed frequency signal.

Analog 56 circuitry conditions the difference frequency signal output from the mixer 53 for use by the digital circuit 58. Using a decision algorithm in the digital circuit, movement of the target surface 23 may be established, e.g., for an ice motion detection and alerting system, movement of the river ice sheet or rubble. Analog circuitry 56 includes a bandpass (BP) filter 56A, at least one amplifier 56B, and a threshold circuit 56C, such as a Schmitt trigger. Preferably, the analog circuitry 56 includes two amplifiers 56B, one each positioned on the input and output sides of the BP filter 56A. For an ice motion detection and alerting system, the cutoff frequencies of the BP filter 56A may be selected to reject frequency products outside the range of expected velocity of the ice sheet or rubble, thereby providing a degree of false alarm protection from events that are too fast to be moving ice, such as snowmobiles traversing the ice cover. See for example, FIG. 4 indicating a difference frequency of approximately 33 Hz for a velocity of 10 m/s at a 0° offset. Should one expect ice to move at less than about 10 m/s then the cutoff frequency could be established, via a decision algorithm, to yield only those difference frequencies, $f_{DOP}$, of less than 33 Hz for those installations of the system that employ a 0° offset:

The digital circuit 58 is programmed with a decision algorithm for determining movement of the target surface 23 only, based upon both the value and the duration of the difference frequency signal output by the analog circuitry 56. That is, notification may be delayed past any initial detection of motion by a predetermined period of time. This serves to prevent false alarms due to motion of transient objects (not separately shown) on the target surface 23 that are within the field of view of the motion detection and alerting system 50, e.g., for an ice motion detection and alerting system, those items other than the river ice sheet or rubble. When the digital circuit 58 establishes movement of the correct type, it sends appropriate notification to a responsible authority, preferably through a wireless communications device 51.

The use of a wireless communications device 51 allows the responsible authority to be at any location remote from the motion detector system 50. In a preferred embodiment of the invention, the wireless communications device 51 is a telephone autodialer 51A and a cellular telephone (not separately shown) or antenna 51B. However, other wireless communication devices 51, such as a personal digital assistant (PDA), RF telemetry transceiver, RF transceiver, and acoustical or optical communications devices, are also within the scope of the present invention.

Figure 8:
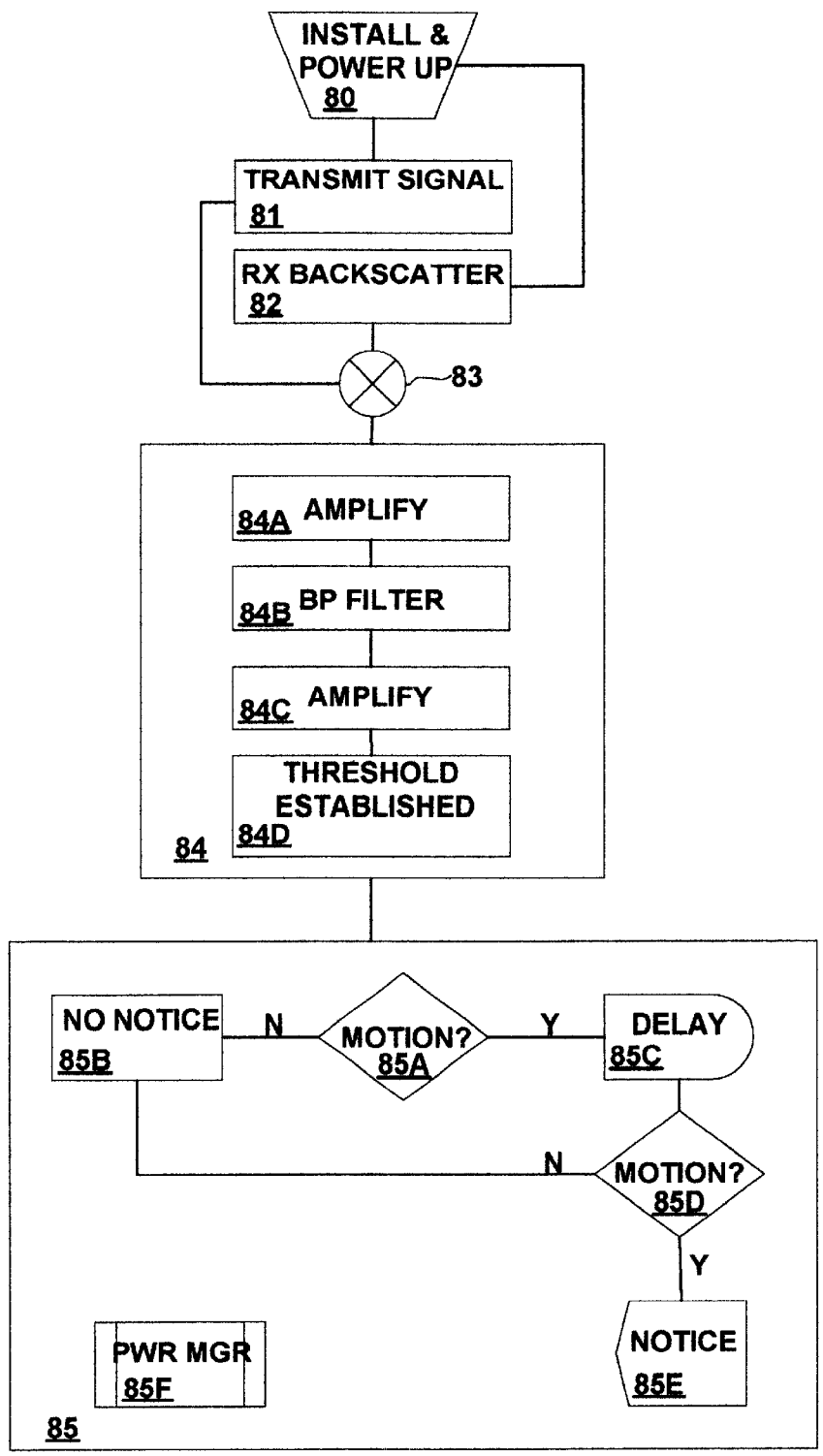
FIG. 8 is a block diagram illustrating the method of detecting and alerting to movement of a slow-moving surface in using a preferred embodiment of the present invention.

In preferred embodiments, the digital circuit 58 also includes power or energy management functionality (not separately shown except in FIG. 8 as a function 85F). This permits certain sub-systems within a motion detection and alerting system 50 to be taken off line or to be operated cyclically to save energy. For example, if environmental conditions are taken into consideration, perhaps a target surface 23 need not be monitored continuously, and thus illumination may be switched on and off, e.g., maintaining marginal coverage during times when ice breakup is not expected and optimal coverage at other times, but not necessarily continual coverage unless pre-specified movement has been detected. This power management capability may be "programmed in" using a simple algorithm suitable for modification to address specific applications. Since the motion detection and alerting system 50 may be powered by a battery 59A augmented by a solar panel 59B, power management functionality improves the power budget by optimizing average demand, thereby reducing the size of the battery 59A and any connected solar panel 59B. Lithium cells or lead-acid gel cells may be used. Further, the batteries need not be installed on the circuit board but may be in another weather-tight box separated from the Doppler radar and interconnected by a power cable (not shown separately).

Figure 6:
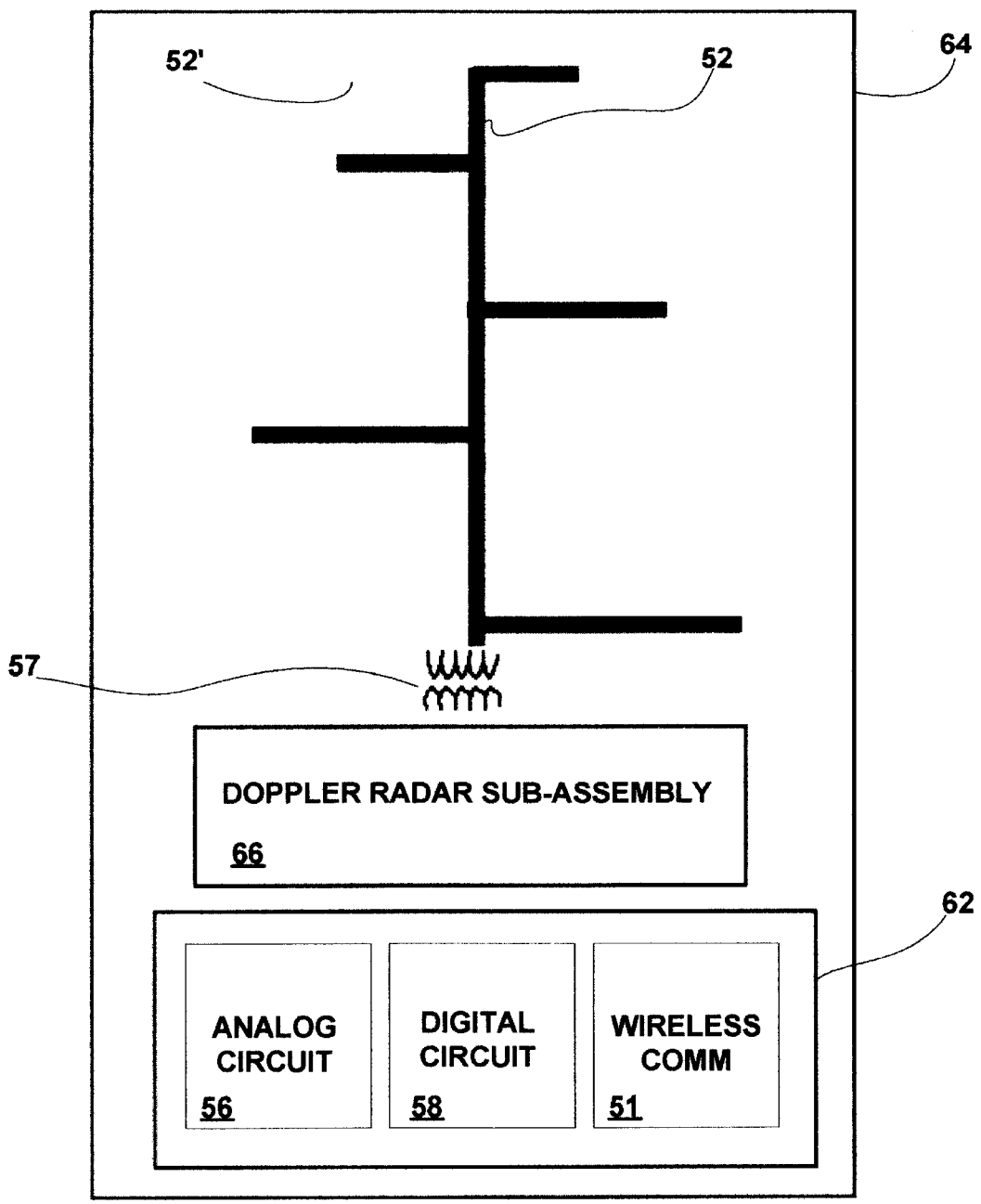
FIG. 6 is a schematic diagram of a preferred embodiment of the present invention as laid out on a printed circuit board.

Refer to FIG. 6. As alluded to above, the use of a stripline antenna 10 allows the motion detection and alerting system 50 to be integrated onto a single circuit board 64. In a preferred embodiment, a stripline beam antenna 10, 10' is etched onto the top (antenna 10) and bottom (antenna 10') surfaces of the circuit board 64. A CW radar front-end 16 and a mixer 53 are included within a CW radar sub-assembly 66 that may include the antenna 10, 10', a mixer 23, a T-connector 55 and an impedance matching transformer 57. In a preferred embodiment, analog circuitry 56, a digital circuit 58, and a wireless communications device 51 are included within a processing sub-assembly 62.

Figure 7A:
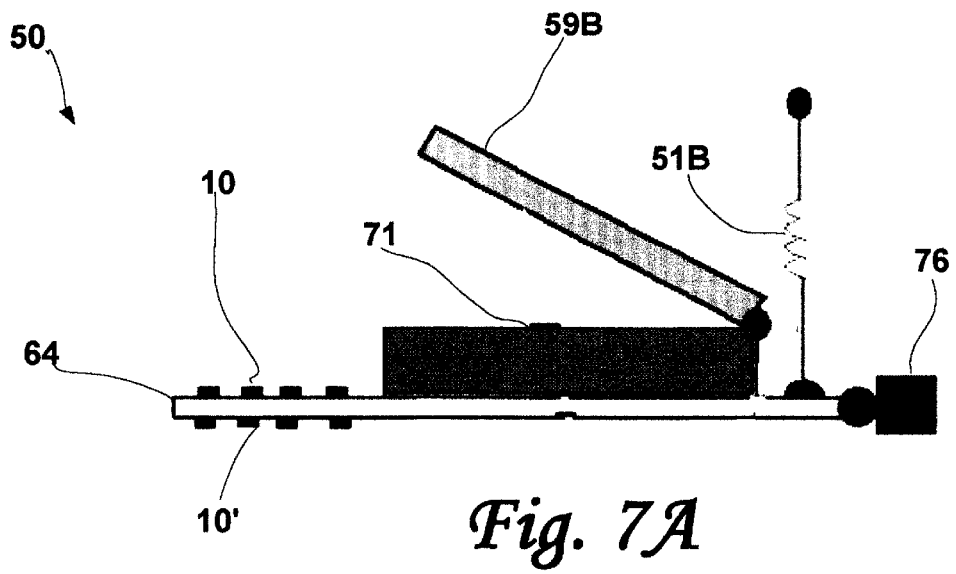
FIG. 7A is a side view of a preferred embodiment of the present invention as packaged.
Figure 7B:
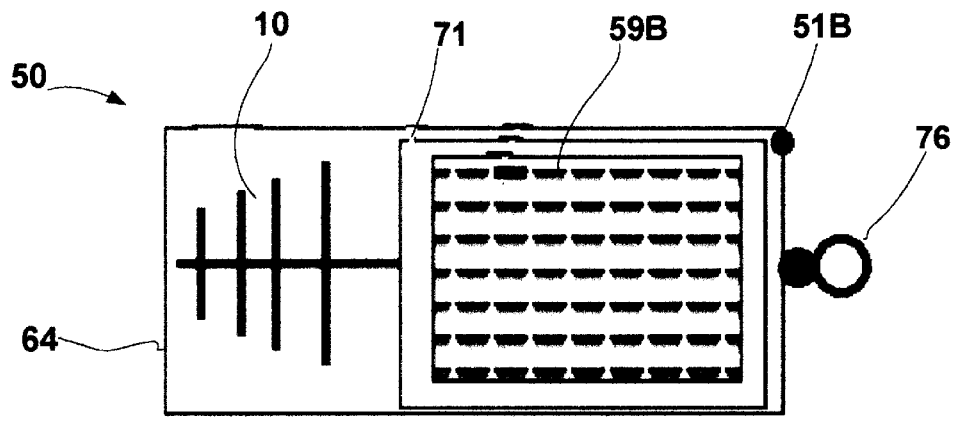
FIG. 7B is a top view of a preferred embodiment of the present invention as packaged.

Refer to FIGS. 7A and 7B. The packaged motion detection and alerting system 50 is shown in side and top views, respectively. In order to securely mount the motion detection and alerting system 50 in the proximity of the target surface 23 of interest, such as a river ice sheet or rubble field, a mounting bracket 76 is provided. The mounting bracket 76 may be either fixed or adjustable. Further, to protect the motion detection and alerting system 50 from the environment, a weatherproof enclosure 71 may be provided around the various electronic components.

The operation of the motion detection and alerting system 50 is described with reference to FIG. 8. In step 80, the motion detection and alerting system 50 is mounted and powered up from a fixed point overlooking the target surface 23, such as a river. Since the system 50 is intended for detecting and alerting to motion, e.g., in a preferred embodiment movement of ice or rubble, and not necessarily for velocity or acceleration measurement, the selection of α and β may not be critical. However, for simple motion detection and alerting, both α and β should be kept as small as possible to obtain the highest difference frequency output relative to the velocity of ice or rubble as calculated using Eqn. (1). See also FIG. 4. In the event measurement of actual velocity of ice movement is desired, the system 50 may be accurately positioned to within one degree in the vertical plane using an inclinometer (not separately shown). One skilled in the art may add functionality within the digital circuit 58 to allow measurement of velocity. To achieve the horizontal relationship, the system 50 may be aimed visually upstream at a pre-specified angle, α, relative to the direction of river flow at that point.

In step 81, the transmitted signal 14 is sent at the frequency, $f_{source}$. The backscattered signal 25 is received in step 82 and mixed with the reference signal in step 83. As described above, this mixing 83 produces several signal products, including the difference frequency signal at $f_{DOP}$.

These signal products are then passed to the analog circuitry 56 where they are processed in step 84. Analog processing conditions the signal products for digital processing. First, three of the signal products, the reference signal, the backscatter signal 25, and the difference frequency signal are amplified in step 84A. These signal products are then bandpass-filtered in step 84B. The cutoff frequencies are selected based on the expected velocity range of motion desired to be detected. Here, the reference and backscatter 25 signals, as well as their sum, being at microwave frequencies, are filtered out, leaving only the difference frequency signal, $f_{DOP}$. The difference frequency signal is amplified in step 84C to an appropriate level to be input into a threshold circuit 56C, such as a Schmitt trigger. In step 84D, the threshold circuit converts the analog output into a level appropriate for digital processing.

Analog to digital conversion, subsequent digital signal processing and the notification decision process occur in step 85. First, the digitized difference frequency signal is analyzed in step 85A, using a decision algorithm to determine if there is motion, i.e., if $f_{DOP}>0$. If $f_{DOP}=0$, no notification is sent as indicated at step 85B. A non-zero $f_{DOP}$ indicates potential motion of interest. Since the system 50 is sensitive to motion of objects that fall within its field of view, transient passage by animals, skiers, hikers, and motor vehicles also causes a non-zero difference frequency signal. To reduce the occurrence of false alarms, a delay of between five and sixty seconds, preferably approximately fifteen seconds is inserted, as indicated in step 85C. If, after the delay 85C, the system 50 detects a non-zero difference frequency signal as indicated at step 85D, notification is sent as indicated in step 85E. This "sample and delay" routine may be repeated to account for multiple occurrences of transient passage within a short period, e.g., to enable verification where more than one animal, person or vehicle crosses the target surface 23 within a short period of time. Of course, if a decision algorithm has been implemented at the BP filtering step 84B so that Doppler frequencies above a pre-specified frequency are cut off, this delay step 85C may need to operate as a check against only slow moving vehicles, personnel or animals. In a preferred embodiment, notification at step 85E is sent via cellular telephone, either by simply ringing the receiving telephone or by providing a voice-synthesized warning message upon answer. Optional power management occurs continuously as indicated in step 85F.

In a preferred embodiment, an optimum frequency range is 1.0 GHz–10 GHz, depending on the required resolution and specification application, as dictated by Eqn. (1). Power requirements are minimal, e.g., for ice and rubble field movement, 10–20 mW as provided by modular COTS RF oscillators is preferred, although systems with greater power levels may be implemented, depending upon the application. The sampling rate is in accordance with the Nyquist criterion for the highest audio Doppler output frequency expected to be usable by the system. This is most likely from approximately 100 Hz–10 KHz, again depending on the application and concomitant system parameters, e.g., the expected speed of phenomena being monitored as dictated by Eqn. (1).

While the invention has been described in terms of its preferred embodiments, those skilled in the art will recognize that the invention can be practiced with modifications within the spirit and scope of the appended claims. For example, although the system is described in specific examples for detecting movement of an ice or rubble surface, it will operate on any non-smooth surface so that it may also be useful for detecting movement prior to and during events such as earthquakes, mudslides, flash floods, and for monitoring certain industrial processes. Further, the source may be operated with other types of electromagnetic energy such as acoustical, ultrasonic, and optical, including visible, IR, and UV. Additionally, these motion detectors may be arranged in arrays to cover a resultant large field of view such as may be expected when monitoring a glacier. Thus, it is intended that all matter contained in the foregoing description or shown in the accompanying drawings shall be interpreted as illustrative rather than limiting, and the invention should be defined only in accordance with the following claims and their equivalents.

We claim:

1. A compact, inexpensive, autonomous motion detection and alerting system for detecting motion within a pre-specified velocity range, components of said system comprising:

at least one transceiver sub-assembly;
  wherein said at least one transceiver sub-assembly:
    propagates electromagnetic energy as a transmitted signal in a pre-specified pattern and direction to illuminate a non-smooth surface;
    receives at least some energy reflected therefrom as a reflected signal; and
    provides a reference signal at a pre-specified sampling rate; and
at least one signal processing sub-assembly in operable communication with said at least one transceiver sub-assembly,
  wherein, by determining the difference in frequency between said reference signal and said reflected signal, said at least one processing sub-assembly establishes the existence of a pre-specified range of Doppler frequencies that may be correlated to motion having velocities within said pre-specified velocity range, and
  wherein said at least one processing sub-assembly employs at least one decision algorithm to establish movement of said non-smooth surface, and wherein said at least one processing sub-assembly enables said alerting based upon a pre-specified output of said decision algorithm.

2. The system of claim 1 in which said transceiver sub-assembly comprises:

at least one radar transceiver;
at least one connector in operable communication with said at least one radar transceiver;
at least one antenna in operable communication with said at least one connector;

at least one impedance matching device in operable communication with said at least one connector and said at least one antenna; and at least one signal mixer in operable communication with said connector,
  wherein said at least one signal mixer receives signal inputs from said at least one radar transceiver and said at least one antenna via said at least one connector and outputs at least one signal product, said at least one signal product to include at least one signal at a Doppler frequency as appropriate.

3. The system of claim 2 mounted on a single printed circuit (PC) board, in which:
  said at least one radar transceiver comprises a CW microwave source having an average output power between approximately 10 and 20 dBm;
  said at least one connector comprises a T-connector;
  said at least one impedance matching device comprises an impedance matching transformer;
  said at least one antenna comprises a strip line beam antenna; and
  said at least one signal mixer comprises a single-end signal mixer.

4. The system of claim 2 in which said at least one antenna is selected from the group consisting of: a stripline antenna, a stripline beam antenna, a Yagi stripline beam antenna, a log periodic array (LPA) stripline beam antenna, a wire element beam antenna, a tubular element beam antenna, a microwave horn antenna, a microwave dish antenna, and any combination thereof.

5. The system of claim 4 in which said at least one antenna offers both forward gain of approximately at least 10 dB and antenna main lobe dimensions of approximately 60° or less.

6. The system of claim 3 in which said processing sub-assembly comprises:
  analog circuitry in operable communication with said transceiver sub-assembly,
    wherein said analog circuitry conditions said signals for digital processing;
  digital circuitry in operable communication with said analog circuitry;
    wherein said digital circuitry employs at least one decision algorithm for determining movement of said non-smooth surface; and
  a communications device in operable communication with said digital circuitry.

7. The system of claim 6 in which:
  said analog circuitry comprises:
    at least one first amplifier for amplifying at least one said signal product from said signal mixer;
    at least one bandpass filter having an input and an output;
      wherein said at least one bandpass filter passes only those Doppler frequencies that correlate to said pre-specified velocity range;
    at least one second amplifier, having an input and an output, for amplifying said output of said bandpass filter; and
    a Schmitt trigger for final conditioning of said output of said second amplifier;
  said digital circuitry comprises:
    at least one analog-to-digital (A/D) converter in operable communication with said threshold circuit;
    a digital signal processor (DSP) in operable communication with said A/D converter,
      wherein said DSP implements said at least one decision algorithm and a power management function; and
  said communications device comprises:
    at least one autodialer;
    at least one cellular phone; and
    at least one cellular phone antenna.

8. The system of claim 7 in which at least some of said system's components are enclosed within a weatherproof enclosure.

9. The system of claim 7 further comprising a power source installed on said single PC board.

10. The system of claim 9 in which said power source includes at least one solar panel augmenting at least one rechargeable battery.

11. The system of claim 7, further comprising at least one mounting bracket.

12. A method for detecting and alerting to the movement of a target surface, comprising:
  mounting, at a location proximate said target surface, a motion detecting and alerting system having components to include a transceiver for producing a first signal containing electromagnetic energy;
  providing power to said motion detecting and alerting system;
  illuminating at least part of said at least one target surface with said first signal;
  receiving at least one second signal representing electromagnetic energy reflected from said target surface as a result of said illuminating;
  processing said at least one second signal together with at least one reference signal provided from said transceiver,
    wherein said processing produces at least one difference frequency signal representing the difference in frequency between said at least one reference signal and said at least one second signal;
  establishing a value of said at least one difference frequency signal,
    wherein a non-zero value indicates motion that may be of at least one pre-specified type;
  processing any non-zero value difference signal by implementing at least one decision algorithm, having an input and an output, to minimize false alarms; and
  using said output of said at least one decision algorithm, providing notification of any occurrence of said at least one pre-specified type of said motion.

13. The method of claim 12, in which said notification, at least in part, comprises placing a telephone call automatically.

14. The method of claim 12, in which said establishing said value of said at least one difference frequency signal further comprises introducing at least one pre-specified delay period prior to sending said notification.

15. The method of claim 12, further comprising selectively powering said components based on system demand.

16. The method of claim 12, further comprising mounting said system such that said antenna is oriented in respect to said target surface at an offset angle less than approximately 60° both laterally and in elevation.

17. The method of claim 12, further comprising mounting said system such that said antenna is oriented in respect to said target surface with an offset angle between approximately 0° and 30° both laterally and in elevation.

18. The method of claim 12, further comprising using an inclinometer to achieve an accuracy of at least ±1.0° in orienting said system.

19. An autonomous ice sheet and rubble motion detecting and alerting system, components of said system mounted on at least one printed circuit (PC) board, said system comprising:
- at least one transceiver sub-assembly;
  - wherein said at least one transceiver sub-assembly:
    - propagates electromagnetic energy as a transmitted signal in a pre-specified pattern and direction to illuminate said ice sheet and rubble;
    - receives at least some energy reflected therefrom as a reflected signal; and
    - provides a reference signal; and
- at least one signal processing sub-assembly in operable communication with said at least one transceiver sub-assembly,
  - wherein, by comparing said propagated signal with said reflected signal, said at least one processing sub-assembly establishes the existence of a pre-specified range of Doppler frequencies that may be correlated to an expected velocity of motion representative of said ice sheet and rubble, and
  - wherein said at least one processing sub-assembly employs at least one decision algorithm to establish movement of said ice sheet and rubble, and wherein said at least one processing sub-assembly enables said alerting based upon a pre-specified output of said decision algorithm.

20. The system of claim 19 in which said transceiver sub-assembly incorporates a CW radar front-end.

* * * * *

UNITED STATES PATENT AND TRADEMARK OFFICE
CERTIFICATE OF CORRECTION

PATENT NO. : 6,700,528 B2
DATED : March 2, 2004
INVENTOR(S) : Christopher R. Williams and Norbert E. Yankielun It is certified that error appears in the above-identified patent and that said Letters Patent is hereby corrected as shown below:

Column 1,
Lines 5-8, replace with:
-- Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact either Sharon Borland at 603 646-4735 or Phillip Stewart at 601 634-4113. --

Column 2,
Line 35, delete "2" and insert -- two --

Column 3,
Line 42, should read -- continuous wave (CW) microwave source having an average output power --

Column 5,
Line 9, insert -- , -- between "frequency" and "$f_{DOP}$,"

Column 7,
Line 27, should read -- (all not shown separately) may be used. The mixer 53 may --
Line 29, should read -- shown) operating as a mixer. The mixer 53 outputs the signal products --
Line 33, should read -- Analog ciruitry 56 conditions the difference frequency --
Line 35, should read -- 58. Using a decision algorithm in the digital circuit 58, move- --
Line 37, insert -- 50, -- between "system" and "movement"
Line 43, insert -- 50, -- between "system" and "the"

Column 8,
Line 12, insert -- (all not shown separately) -- between "devices" and ", are"
Line 16, should read -- shown separately except in Fig.8 as a function 85f). This --
Lines 34-36, should read -- cells or lead-acid gel cells may be used. Further, the batteries 59A need not be installed on the circuit board 64 but may be in another weather-tight box separated from the Doppler radar 16 --

UNITED STATES PATENT AND TRADEMARK OFFICE
CERTIFICATE OF CORRECTION

PATENT NO. : 6,700,528 B2
DATED : March 2, 2004
INVENTOR(S) : Christopher R. Williams and Norbert E. Yankielun It is certified that error appears in the above-identified patent and that said Letters Patent is hereby corrected as shown below:

Column 9,
Line 33, insert -- 56C -- between "circuit" and "converts"

Signed and Sealed this

Fifteenth Day of June, 2004

JON W. DUDAS
*Acting Director of the United States Patent and Trademark Office*